(12) United States Patent
Norris

(10) Patent No.: US 8,431,010 B2
(45) Date of Patent: Apr. 30, 2013

(54) METHOD AND APPARATUS FOR REMOVING IMPURITIES FROM A LIQUID

(75) Inventor: Bruce E. Norris, Montgomery, TX (US)

(73) Assignee: Water Vision Incorporated, Montgomery, TX (US)

( * ) Notice: Subject to any disclaimer, the term of this patent is extended or adjusted under 35 U.S.C. 154(b) by 387 days.

(21) Appl. No.: 12/767,583

(22) Filed: Apr. 26, 2010

(65) Prior Publication Data

US 2011/0114510 A1 May 19, 2011

Related U.S. Application Data

(63) Continuation-in-part of application No. 12/621,682, filed on Nov. 19, 2009.

(51) Int. Cl.
*C02F 1/461* (2006.01)

(52) U.S. Cl.
USPC .......................................... 205/755; 204/275.1

(58) Field of Classification Search .......... 205/742–744, 205/755, 758–761
See application file for complete search history.

(56) References Cited

U.S. PATENT DOCUMENTS

| | | |
|---|---|---|
| 3,527,617 A | 9/1970 | Prober |
| 4,828,667 A | 5/1989 | Silvestri et al. |
| 6,120,690 A | 9/2000 | Haase |
| 6,274,028 B1 | 8/2001 | Hu et al. |
| 6,358,398 B1 * | 3/2002 | Halldorson et al. .......... 205/754 |
| 6,663,766 B1 | 12/2003 | Adin et al. |
| 6,800,206 B2 * | 10/2004 | Robinson ...................... 210/746 |
| 6,878,268 B2 | 4/2005 | Sawada |
| 7,796,903 B2 * | 9/2010 | Kagawa et al. ................. 399/50 |
| 2002/0014460 A1 * | 2/2002 | McKay ......................... 210/696 |
| 2011/0114509 A1 * | 5/2011 | Norris ........................... 205/687 |

FOREIGN PATENT DOCUMENTS

| | | |
|---|---|---|
| GB | 1331251 | 9/1973 |
| GB | 1498355 | 1/1978 |
| WO | 2007140802 | 12/2007 |

* cited by examiner

*Primary Examiner* — Keith Hendricks
*Assistant Examiner* — Salil Jain
(74) *Attorney, Agent, or Firm* — John J. Love; Cooke Law Firm

(57) ABSTRACT

A method and system for purifying liquid is disclosed that includes combining powdered metal particles with the fluid to be treated. The mixture of powdered metal particles or metal and liquid to be treated is then passed through an electrolytic cell. The cell forms multivalent ions which attach to contaminants in the liquid and are subsequently separated out from the liquid using conventional solid/liquid separation techniques. The multivalent ions may also be formed from thin strips of aluminum or formed by pressing layers of powdered metallic particles together and installing in the electrolytic cell between two cathodes, the powdered metal electrode being the anode.

4 Claims, 4 Drawing Sheets

METHOD AND APPARATUS FOR REMOVING IMPURITIES FROM A LIQUID

CROSS-REFERENCE TO RELATED APPLICATIONS

This application is a continuation-in-part of copending application Ser. No. 12/621,682 filed Nov. 19, 2009.

BACKGROUND OF INVENTION

1. Field of the Invention

The subject matter disclosed in this application relates to the art of removing impurities and other contaminants, for example organics, from liquids, for example water, using an electrolytic process.

2. Description of Related Art

Electrolytic processes have been in existence for many years. In each case, the prior equipment has been plagued with a continuous buildup of foreign materials on the electrodes which stops the release of metallic ions and causes pitting and damage to the electrodes. As the electrodes are plated with these foreign materials, more voltage is required to maintain the same amount of metal ions being released. The high power eventually causes the unit to stop functioning properly thus requiring the unit to be shut down. Prior attempts to solve the problem include the use of non conductive and even conductive pellets or balls in a fluidized bed to clean the electrodes. Liquid fluidized beds with, for example a four foot per second fluid velocity are inadequate to remove the deposits from the electrodes. Other approaches include reversing the polarity of the electrodes frequently to keep the electrodes clean. Still another approach is to increase the fluid velocity. These approaches have achieved little or no success.

BRIEF SUMMARY OF THE INVENTION

The present invention prevents the buildup of oxides and other foreign materials on the electrodes of an electrolytic cell by introducing multivalent powder or strips into the contaminated liquid and by assuring the thickness of the multivalent powder or strips is thin enough to be completely consumed prior to any build up occurring. The metal can be either multivalent metal particles like aluminum, iron, zinc, and magnesium for example, or other coagulating metals whose salts aid coagulation. Multivalent ions, or floc, are produced by the current flowing in the electrode grid, which attracts and attaches to the impurities, both organic and inorganic, and other foreign materials in the water. The metal ions required for flocculation can be produced from appropriate metal powders consisting of one or multiple types of metal powders: iron, zinc, magnesium and aluminum, for example, which can be blended with the feed stream prior to the feed stream entering the main electrolytic cell or introduced directly into the cell. In addition to powdered metal particles, thin strips of multivalent metals are also effective as a source of multivalent ions and can be used in much the same manner as powdered metal particles. In another embodiment of the invention, a porous anode plate electrode is formed by compacting powdered metal particles. Using these plate-like anodes in a conventional electrolytic cell with noble electrodes resulted in formation of multivalent ions with virtually no accumulation of oxides on the electrodes and no major change in the voltage or current. Conventional metal and/or non-fouling noble electrodes or a combination of both can be used in accordance with the invention. The electrodes can either both be coated, with a noble coating such as ruthenium, or both uncoated. With respect to the metal strips, they can also be formed of multivalent ion producing metals such as iron, zinc, magnesium and aluminum, for example. They can also be formed of a noble metal. Furthermore they can be either coated with a noble coating or uncoated. This process also destroys pathogens and removes them from the liquid along with the other impurities and contaminants.

BRIEF DESCRIPTION OF THE SEVERAL VIEWS OF THE DRAWING(S)

DETAILED DESCRIPTION OF THE INVENTION

Figure 1:
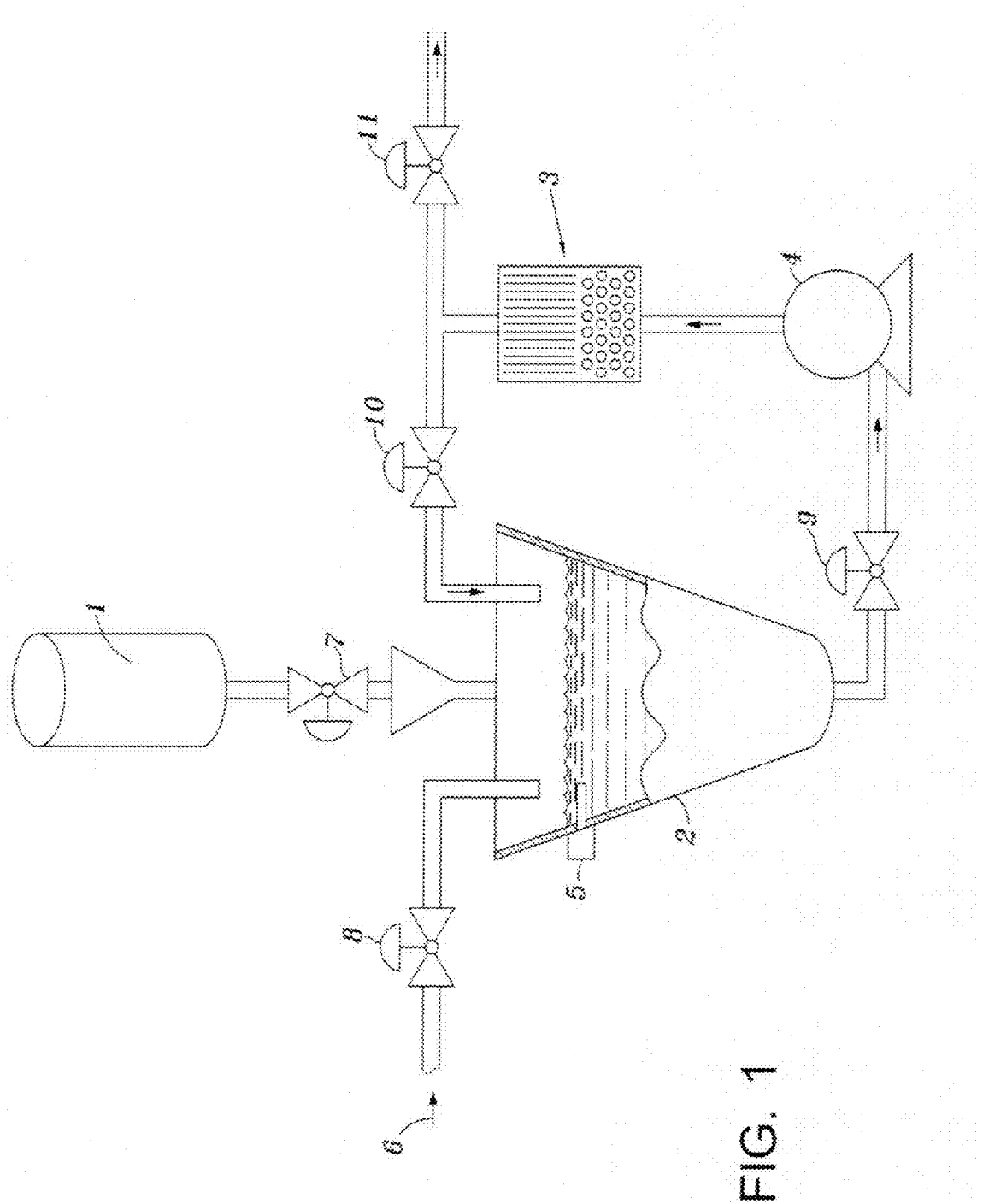
FIG. 1 is a diagram of a system for preparing an aqueous solution of the powdered metal particles according to an embodiment of the disclosure.

Turning now to FIG. 1, this drawing shows a process for the makeup of the metallic powder liquid stream. Metal powder is added to mixing tank 2 from the metal powder concentrate tank 1 through valve 7. Make up water 6 is added to the mixing tank 2 and the level is controlled by level controller 5 which controls valve 8. Once the level is correct, the mixing tank valve 9 opens, the recirculation valve 10 opens and the powdered metal outlet valve 11 remains closed. The mixing tank recirculation pump is then started and the mixture flows into an optional secondary cell 3 where the metal powder could be consumed during a timed cycle and the metal ions would then flow through the recirculation valve 10 and back into the mixing tank 2. This cycle would continue until all the metal powder is consumed and the metal floc would remain in the mixing tank 2 until metered through the powdered metal outlet valve 11 into the primary cell 12 shown in FIG. 2 at a flow rate which is based on the feed rate of the raw feed 14. If the optional secondary cell 3 is not installed, the flow from the mixing tank recirculation pump 4 would flow through the recirculation valve 10 and back into the mixing tank 2. The continued circulation helps to keep the powdered metal in solution and also acts as the pump which feeds the metal powder injection stream 17 to the primary cell 12. Thus while a secondary cell 3 has been shown in FIG. 1, this is not necessary to carry out the principles according to one embodiment of the invention. Also it is possible to directly introduce the powder particles into the primary cell without prior mixing of any kind.

Figure 2:
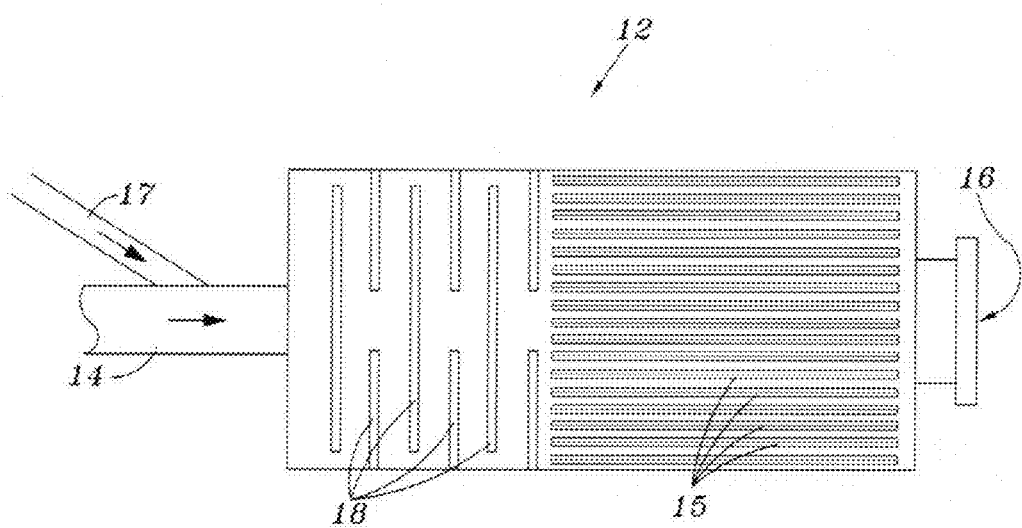
FIG. 2 is a cross sectional view of an electrolytic cell according to an embodiment of the disclosure.

FIG. 2 illustrates an embodiment of the primary cell. Fluid to be treated is introduced into cell 12 via an input conduit 14. Powdered metal particles may be introduced into the input conduit 14. A plurality of mixing baffles 18 can be provided within the cell for mixing the powdered metal particles with the fluid to be treated. It is noted however that powdered metal input conduit 17 could be directly connected to the primary cell for mixing with the fluid to be treated within the cell itself. A plurality of planar type electrodes 15 are positioned within the cell. The electrodes 15 are alternately connected to the positive and negative portions of a current source as is well known in the art. The electrodes may be obtained from various sources such as Optimum Anode Technologies. An outlet for the treated fluid is provided at 16. Treated fluid from outlet 16 can be directed to a storage tank where the treated solids and floc can be removed using known techniques. Powdered metal particles up to approximately 0.0625 inches in diameter can be used most effectively.

Figure 3:
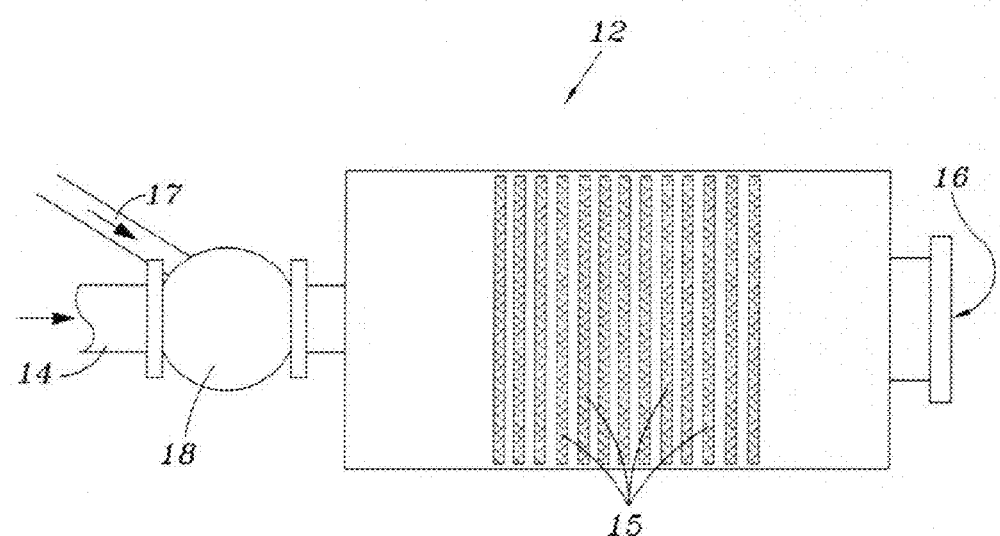
FIG. 3 is a cross sectional view of a second embodiment of an electrolytic cell according to the disclosure.

FIG. 3 illustrates an alternate embodiment of primary cell 12. Primary cell 12 has electrodes 15 which are installed transversely to the flow of the raw feed 14. This type of electrode 15 can be a mesh or expanded metal structure with noble metal coatings such as ruthenium. This type of electrode 15 allows the raw feed 14 and metal powder mixture to flow through the electrodes in lieu of flowing parallel with the electrodes. This arrangement is useful in the removal of some contaminants such as benzene. This arrangement also shows external mixing baffles 18, which act the same way as the mixing baffles 18 shown in FIG. 2.

Figure 4:
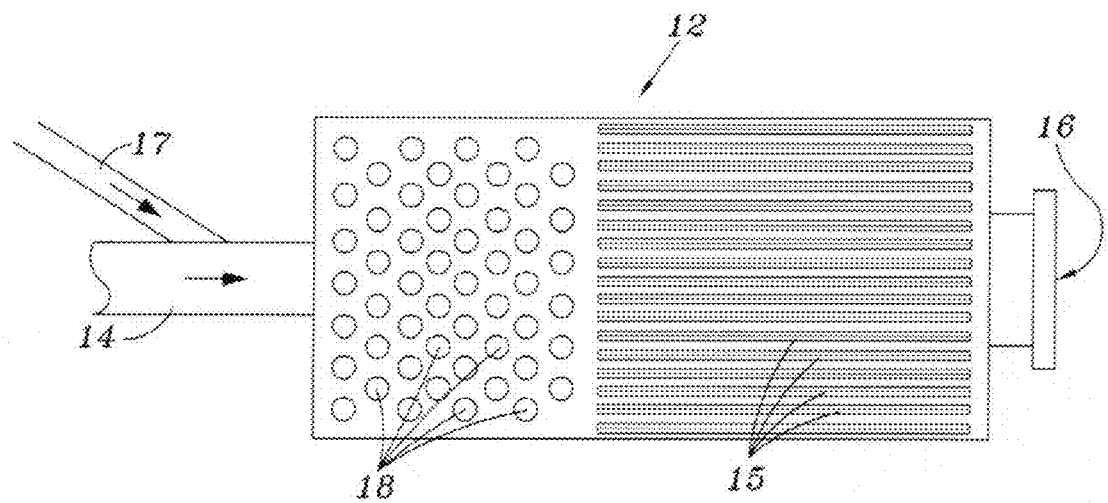
FIG. 4 is a cross sectional view of a third embodiment of an electrolytic cell according to the disclosure.

FIG. 4 illustrates a further embodiment of primary cell 12. In this embodiment, the electrodes 15 are shown in a longitudinal array. Mixing baffles 18 are made of round tubing or rods with noble metal coatings which can be connected to alternating current or direct current for additional electrode surface area. The placement of the round mixing baffles 18 which can act as additional electrodes can also allow more residence time of the raw feed in the electrolytic field for the destruction of pathogens. This round tubing coated with a noble metal design can also act as a replacement for the plate or mesh type electrodes 15 used in either the primary cell 12 or the secondary cell 3.

Figure 5:
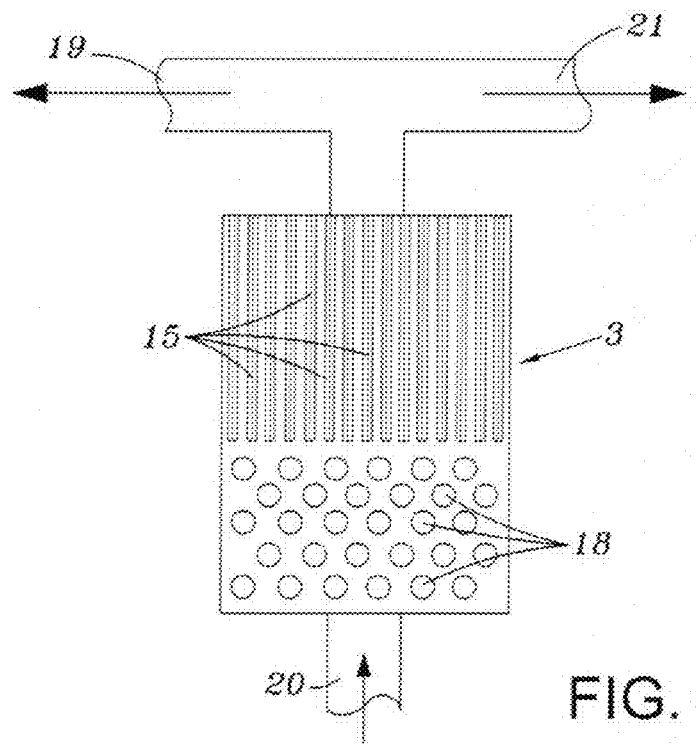
FIG. 5 is an enlarged view of the optional secondary cell.

FIG. 5 shows the optional secondary cell 3 and the flow of powdered metal stream through the cell. The powdered metal stream will originate from the inlet from recirculation pump 20 and flow into the mixing baffles 18 which can be tubing, plate or other types of mixing baffles 18 but can also be round tubing coated with a noble coating such as ruthenium and connected to either alternating current or direct current. This design adds additional electrode surface area to the secondary cell 3. The electrodes 15 can be longitudinal noble plates, a noble metal mesh or other noble metal coated types of electrode designs. This optional secondary cell 3 would be used to generate metallic ions which are stored in the mixing tank 2 to be directly injected utilizing the metal powder injection stream 17 into the raw feed 14 streams either ahead of the primary cell 12 or directly into the cell 12.

Figure 6:
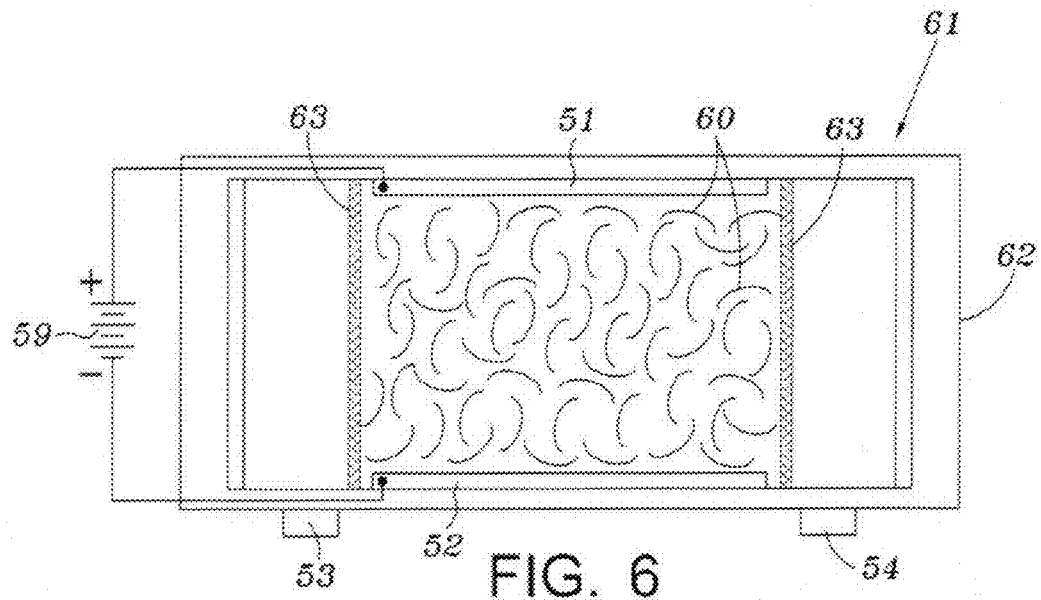
FIG. 6 is a schematic showing of another embodiment of an electrolytic cell according to the disclosure.

FIG. 6 illustrates a further embodiment of the invention wherein in lieu of powdered metal particles, thin strips of multivalent metals or other coagulating metals are used. Electrodes 51, 52 formed of a noble or consumable metal are connected to the positive and negative terminals of a suitable source of electrical current 59. Pieces or strips of multivalent metal 60 approximately fifty thousandths of an inch thick or thinner are placed within the cell housing 62 and are subsequently dispersed in the fluid to be treated which enters through inlet 53. The treated fluid is withdrawn from the cell 61 through outlet 54. The electrodes 51 and 52 can optionally be coated with suitable coating such as ruthenium. A thin sheet of non conductive cloth can be used to prohibit scratching of the electrodes or to shield the electrodes from contact with the strips or other bodies. In one embodiment the thin metal material is in the form of cylindrical containers similar to those commonly used for beverages. The metal strips may take the form of woven metal cloth, woven metal pads, planar strips, or other sizes and shapes. In this embodiment, electrodes 51 and 52 must either be exposed to contact with the bodies 60 or both be shielded from contact with the bodies. This is because it is necessary from time to time to reverse the polarity of the electrodes. The thin strips or bodies have a thin film of the fluid on them which allows for current to pass but does not create a shorting out of the circuit. Thus if the bodies did not contact both electrodes, reversal of polarity could not be achieved if one electrode was shielded from the bodies. In the event both electrodes are isolated, reverse polarities can be achieved by merely changing the polarity of the electrodes.

A test apparatus according to the embodiment of FIG. 6 was constructed as follows. The electrolytic cell consisted of a square container approximately eighteen inches square and fourteen inches deep. Two noble electrodes were placed on opposite sides of the container as shown. The power source varied between three to ten volts and the current varied between 15 to 50 amps, D.C. The box was filled with empty aluminum beverage cans to approximately two inches from the top of the electrodes. A flow of approximately one gallon per minute of fluid to be treated was initiated. The thin film of water between each of the beverage cans was sufficient to stop any shorting or arcing between the cans. Conductivity was excellent. The result was that the cans were consumed almost completely without any building of a coating on the electrodes that would normally stop the process. A pair of non-conductive containment screens 63 may be positioned within the housing.

Figure 7:
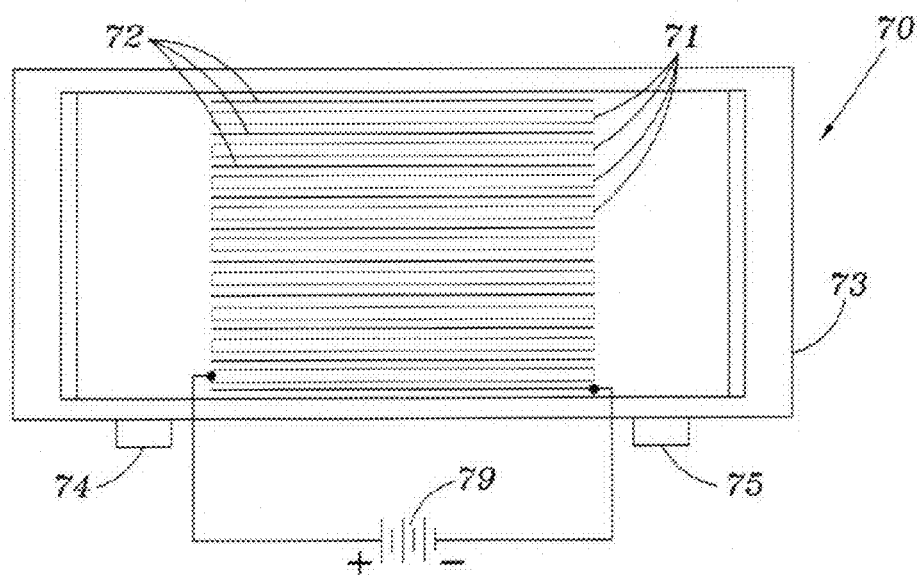
FIG. 7 is a schematic showing of a further embodiment of an electrolytic cell according to the disclosure.

FIG. 7 illustrates another embodiment of the invention. In this embodiment the electrolytic cell 70 includes an inlet 74, outlet 75, and a series of noble or consumable electrodes 72, which may be coated with a suitable coating. A plurality of specially constructed planar electrodes 71 are positioned between the planar electrodes 72. Electrodes 72 are connected to the negative terminal of a DC power source 79 and electrodes 71 are connected to the positive terminal of a DC power source 79. Electrodes 71 are formulated as follows. A ⅜ inch layer of aluminum powder is placed in a three inch chamber mold. A three inch diameter aluminum mesh screen made of 1/16 inch mesh is placed on top of the powder layer. Another ⅜ inch layer of aluminum powder is placed on top of the mesh screen. A flat plate is placed on top of the aluminum powder and a compressive force is applied to the mold to a point where a rigid 3 inch diameter electrode is formed. The resulting electrode is porous and fluid permeable.

In an actual test, the spacing between the electrodes 71 and 72 was approximately ¼ inch. The applied voltage was approximately 20 volts and the current was approximately 2.5 amps. After about 38 hours of emerging in a fluid stream, there was no accumulation of oxides on the electrodes and there were no major changes in the voltage of current. The electrodes 71 were approximately ¾ consumed with no fouling. The lightly compressed powder was consumed in layers which prevented any oxide coating to form on the anode. Thus there was a continuous release of multivalent ions. In lieu of aluminum powder, other multivalent producing metal power particles as identified above can be used.

The electrodes 71 of FIG. 7 could also be formed by pressing together several sheets of metal foil, such as aluminum foil.

Although specific details of an embodiment have been disclosed, it is apparent that other arrangements are possible that would fall within the scope of the claims. For example, various mixtures of different powdered metals can be used and separate mixing hoppers can be used for different powdered metals and injected at the same time or separately. The shape and form of the metal electrodes can be plates, wire mesh, round bars or round tubing, or other shapes, and the electrodes in the primary cell could also be a consumable metal such as iron or a mixture of consumable metal and noble metal electrodes. Furthermore the number of electrodes in the primary cell can be selected based on the flow rate and the residence time required to consume the powdered metal.

Additionally, the primary cell and the secondary cell can be powered by direct current or alternating current with voltages and amperage being controlled based on the flow rate and the waste stream being treated. The primary cell can be completely sealed allowing vertical installation or it could be installed horizontally without being sealed. Also multiple primary cells could be employed using different powdered metal from separate mixing hoppers.

In order to prevent any deposits from forming on the electrodes of the primary and secondary cells, the current can be reversed periodically.

Detailed descriptions of the different embodiments are provided herein. It is to be understood, however that the present invention may be embodied in various forms. For example, the thin metal strips or other configuration of thin metal as discussed in the embodiment of FIG. 6 could be used as a substitute for the powder metal particles used for forming multivalent ions within container 2 shown in FIG. 1. Therefore, specific details disclosed herein are not to be interpreted as limiting, but rather a basis for the claims and as a representative basis for teaching one skilled in the art to employ the present invention in virtually any appropriately detailed system, structure or manner.

Although the present invention has been described with respect to specific details, it is not intended that such details should be regarded as limitations on the scope of the invention, except to the extent that they are included in the accompanying claims.

I claim:

1. An electrolytic liquid treating cell comprising:
   a housing;
   first and second ruthenium coated electrodes;
   a source of D.C. electrical power connected to the electrodes;
   an inlet for liquid to be treated;
   an outlet for the treated fluid;
   a plurality of freely moving hollow cylindrical bodies having a wall and formed of a multivalent ion producing metal within the housing, the wall of said bodies having a thickness dimension of about 0.010 inch or less; and
   both of said electrodes being either exposed to contact with the bodies or being shielded from contact with the bodies.

2. The electrolytic liquid treating cell of claim 1 wherein the hollow cylindrical bodies are aluminum beverage cans.

3. A method of removing impurities from a liquid comprising:
   providing an electrolytic cell including a source of D.C. power, first and second ruthenium coated electrodes, a housing, an inlet and outlet for the liquid and a plurality of freely moving hollow cylindrical bodies having a wall and formed of a multivalent ion producing metal located within the housing, the wall of the hollow cylindrical bodies having a thickness of 0.010 inch or less;
   introducing the liquid to be treated into the housing;
   connecting the first and second electrodes to the D.C. power source thereby forming multivalent metal ions; and
   removing the liquid from the housing.

4. The method of claim 3 wherein the hollow cylindrical bodies are aluminum beverage cans.

* * * * *